United States Patent [19]

Pagani

[11] 4,170,514

[45] Oct. 9, 1979

[54] APPARATUS FOR THE DESALINATION OF SEA WATER, WITH AUTOMATIC REGULATION OF THE FRESH AND SALT WATER LEVELS

[75] Inventor: Giorgio Pagani, Milan, Italy

[73] Assignee: Snamprogetti, S.p.A., Milan, Italy

[21] Appl. No.: 878,468

[22] Filed: Feb. 16, 1978

Related U.S. Application Data

[63] Continuation of Ser. No. 705,011, Jul. 14, 1976, abandoned.

[30] Foreign Application Priority Data

Jul. 15, 1975 [IT] Italy .............................. 25420 A/75

[51] Int. Cl.² .............................................. B01D 1/26
[52] U.S. Cl. .................................. 159/18; 159/27 B; 202/174
[58] Field of Search .................... 159/18, 27; 202/174

[56] References Cited

U.S. PATENT DOCUMENTS

| | | | |
|---|---|---|---|
| 3,647,638 | 3/1972 | Osdor | 159/18 |
| 3,820,581 | 6/1974 | Machida et al. | 159/18 |
| 3,849,259 | 11/1974 | Steinbruchel | 159/18 |

Primary Examiner—Norman Yudkoff
Attorney, Agent, or Firm—Morgan, Finnegan, Pine, Foley & Lee

[57] ABSTRACT

In a sea water desalination apparatus, the improvement consisting in the fact that the levels of sea water and fresh water in the several stages of the multistage installation are regulated by a device comprising a plurality of piezometric tubes in combination with cylindrical sleeves surrounding these tubes and having slots so proportioned as to give a preselected pressure drop.

3 Claims, 4 Drawing Figures

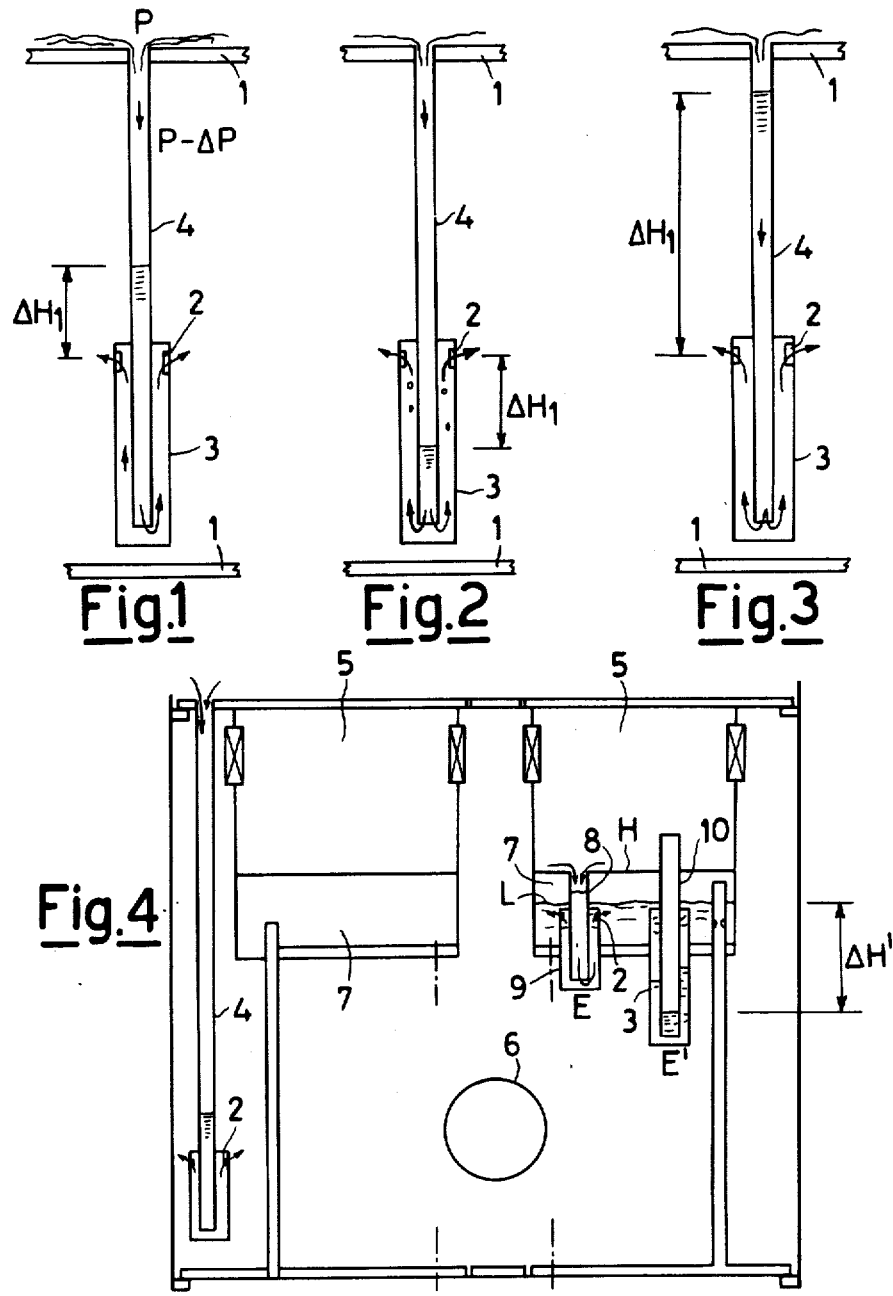

APPARATUS FOR THE DESALINATION OF SEA WATER, WITH AUTOMATIC REGULATION OF THE FRESH AND SALT WATER LEVELS

This is a continuation, of application Ser. No. 705,011 filed July 14, 1976, now abandoned.

This invention relates to an apparatus for the desalination of sea water, with automatic regulation of the levels of the fresh and the salted water.

More particularly, the present invention relates to an automatic device for regulating the levels of fresh water and brine in the multistage desalination process.

From U.S. Pat. No. 3,961,658, an apparatus is known for carrying out a multistage distillation process for sea water.

Such apparatus consists of a vertically positioned column which is partitioned into a plurality of cylindrical sections, each of which comprises a set of elements for the description of which reference is invited to the abovementioned patent specification. The apparatus of the present invention may be briefly described as an apparatus for desalinating sea water that is composed by a vertically positioned column subdivided into a plurality of cylindrical sections, each of which comprises the following component parts:

(a) a film-evaporator in a tube bundle vertical arrangement having preferably a circular cross-sectional outline, without any outer casing;

(b) a tub or basin which is connected at the bottom portion with the top tube plate of the evaporator of the same cylindrical section, in the last section which is deprived of the evaporator, the tub or basin being connected to the brine-discharge, and connected at the top with the bottom tube plate of the evaporator of the overlying section, said tub or basin being connected, in the first cylindrical section, to the sea water feeding tube;

(c) a lamination system or restriction arranged at the bottom of the tub or basin and having the purpose of allowing the flow of the brine from the tub or basin to the underlying tube plate by dissipating the positive pressure differential obtaining between the tub or basin and the tube plates;

(d) openings formed through the upper sidewall of the tub or basin except that of the first cylindrical section;

(e) one or more siphoning tubes for taking the condensate collected at the bottom of each cylindrical section to recyle the condensate at intermediate points of the subsequent cylindrical section;

(f) a preheater housed in a throughtube having a circular or elliptical or rectangular cross-section, the tube being diametrically passed through the tube and welded thereto, the heating means being the steam produced in every cylindrical section, also the steam of the last section being condensed.

The Applicant's attention has been directed to the device which is intended both for transferring the brine from the tub of any section to the tube plate of the film evaporator of the next section, and for transferring the fresh water or the brine from a stage to the next one, a device which in the above-mentioned patent, was shown as a submerged overfall, other devices being equally well suited for this use and particularly valves, especially of the floater type.

A particular static device (self-regulating siphon) has now been found, which, by properly exploiting the "flashing" phenomenon (with evolution of vapor) which takes place during the expansion of the liquid from a stage to the next, permits a self-regulation of the levels in a simple and reliable way, by avoiding the use of moving component parts. Such a transfer device consists of a tube (fall tube) inserted in the upper open end portion of a larger closed end tube (riser) that is coaxial with the first and having specially provided slots, preferably in the cylindrical portion for causing the liquid to emerge from the top portion. The cross-section of the tube can also be other than circular, since it is possible to provide elliptical, rectangular tubes and so on. The cross-section of these slots is calculated in such a way that, during the normal run, the overall load acting on the slots is $\Delta(H_1 + \Delta P/\gamma)$, wherein $\Delta H_1$ is the liquid head in the fall tube and $(\Delta P/\gamma)$ is the pressure differential between two consecutive stages, expressed in terms of height of liquid column.

Under these conditions, the expansion of the liquid takes place only at the outflow and the riser will not contain any water vapor.

In the ensuing description there will be shown the device the subject of the present invention, this description being anyhow intended as being merely an illustration and not a limitation of this invention.

FIG. 1 shows an example of transfer of the liquid (fresh water or brine) from a stage at a pressure P to the subsequent stage at a pressure $P - \Delta P$, wherein the two stages are separated by a specially provided plate 1. In this case, that is, during the normal run, the load acting upon the slots 2 is $\Delta H_1 + \Delta P/\gamma$ and under these conditions the expansion of the liquid takes place only at the outflow and the riser 3 will consequently contain no water vapor.

FIG. 2 shows an example of the case in which the rate of flow of the liquid is reduced and the fall tube 4 will consequently tend to become emptied and the hydraulic head $\Delta H_1$ will become negative relative to the outlet slots 2. The overall load acting upon the slots 2 will thus be $\Delta P/\gamma - \Delta H_1$.

The result is that the liquid will undergo a flashing in the interior of the riser 3 and will evolve steam which, due to its larger specific volume, will drastically reduce the flow cross-section of the liquid and will prevent the fall tube 4 from being totally emptied and thus also from transferring steam from a stage to the next one.

FIG. 3 shows an example of the case in which, less frequently, a rate of flow increase over the nominal value is experienced. In such a case there is an increase of the level of the liquid in the fall tube 4 and the degree of flexibility will be bound to the length of said tube. The insertion of an appropriate overflow tube 10 could prevent an exceedingly large accumulation of liquid in the several stages, whenever it is not possible to provide for an adequately long fall tube. As an alternative to the overflow tube 10, the self-regulating siphon can be designed for a rate of flow greater than the nominal one and if so, obviously, the siphon will work during the normal run under flashing conditions in the riser, as shown in FIG. 2.

FIG. 4 gives an example of a portion of the column with a complete stage which comprises the two evaporators 5 placed side by side and the central preheater 6.

The condensates coming from the stage "n" are passed to the stage "n+1" through the fall tube 1. Since the space occupied by a stage is about 4 to 5 meters, the fall tube can be long enough as to permit wide fluctuations of the level in the tube without giving rise to accumulation problems. In addition, the brine coming from the film evaporators 5 is collected in the relative tubs 7 and the liquid level in each tub is regulated by the self-regulating siphon E, which has the vertical fall tube 8 fastened to a plate H, the latter being internal to the tub 5 and in communication on the one side with the liquid-vapor boundary area and, in addition, has its other end enclosed by a cylindrical sleeve 9, which is coaxial with the fall tube and has a larger diameter than the same, is closed at one end and equipped in the cylindrical portion with slots 2 which give a preselected pressure drop.

Inasmuch as the fall tube cannot be, in this case, long enough as to permit the flow of rates of flow larger than the nominal one, it can be provided so as to have the siphon to operate under flash conditions in the riser portion, as outlined above.

What I claim is:

1. In an apparatus for desalinating sea water characterized in that it is composed by a vertically positioned column subdivided into a plurality of cylindrical sections, each of which comprises the following components:
    (a) a film-evaporator in a tube bundle vertical arrangement having a circular cross-sectional outline;
    (b) a basin which is connected at the bottom portion with a top tube plate of an evaporator in the same cylindrical section, the basin in the last section being deprived of the evaporator and being connected to the brine discharge tube, and said basin connected at its top with a bottom tube plate of the evaporator of the overlying section, said basin being connected, in the first cylindrical section to the sea water feeding tube;
    (c) a lamination system arranged at the bottom of the basin that is adapted to allow brine to flow from the basin to the film evaporator;
    (d) openings formed through the upper sidewall of the basin except that of the cylindrical section;
    (e) one or more siphoning tubes for taking the condensate collected at the bottom of each cylindrical section to recycle the condensate at intermediate points of the subsequent cylindrical section; the improvement which comprises a lamination system that comprises in combination: a fall tube attached to a horizontal plate in the bottom of the basin; said fall tube being inserted in the upper end portion of a larger closed end riser tube that is coaxial with said fall tube; said riser tube having a plurality of slots in its upper portion.

2. In an apparatus for desalinating sea water characterized in that it is composed by a vertically positioned column subdivided into a plurality of cylindrical sections, each of which comprises the following components:
    (a) a film-evaporator in a tube bundle vertical arrangement having a circular cross-sectional outline;
    (b) a basin which is connected at the bottom portion with the top tube plate of the evaporator of the same cylindrical section, the basin in the last section being deprived of the evaporator and being connected to the brine discharge tube, and connected at the top with the bottom tube plate of the evaporator of the overlying section, said tube being connected, in the first cylindrical section to the sea water feeding tube;
    (c) a lamination system arranged at the bottom of the basin that is adapted to allow brine to flow from the basin to the film evaporator;
    (d) openings formed through the upper sidewall of the basin, except that of the cylindrical section; the improvement which comprises as the device for taking the condensate collected at the bottom of each cylindrical section to recycle the condensate at intermediate points of the subsequent cylindrical section, a fall tube inserted in the end portion of a larger closed end riser tube that has a plurality of slots in its upper portion.

3. The apparatus of claim 2 wherein the lamination system comprises in combination a fall tube attached to a horizontal plate in the bottom of said basin, said fall tube being inserted in the upper end portion of a larger closed end riser tube that is coaxial with said fall tube; said riser tube having a plurality of slots in its upper portion.

* * * * *